INVENTOR.
SARKIS NERCESSIAN
BY
*Alfred W. Barber*
ATTORNEY

United States Patent Office 3,527,997
Patented Sept. 8, 1970

3,527,997
REGULATED POWER SUPPLY WITH FOLD-BACK OVERLOAD CURRENT CHARACTERISTIC AND OVERVOLTAGE PROTECTION
Sarkis Nercessian, Long Island City, N.Y., assignor to Forbro Design Corp., New York, N.Y., a corporation of New York
Filed June 21, 1968, Ser. No. 738,895
Int. Cl. G05f 1/58
U.S. Cl. 323—9                    8 Claims

ABSTRACT OF THE DISCLOSURE

A voltage regulated power supply particularly adapted to provide two fixed output voltages incorporates overvoltage protection and current limiting which is proportional to output voltage so that it has a fold-back overload current characteristic.

CROSS-REFERENCE TO RELATED APPLICATIONS

There are no copending applications directly related to the present application.

BACKGROUND OF THE INVENTION

Field of the invention

The present invention relates to Electricity, Voltage Magnitude Control Systems with Current Limiting and Overvoltage Protection.

Description of prior art

Voltage regulated power supplies for providing fixed or adjustable output voltage fro man unregulated source of direct current many times have used a series pass transistor controlled by a transistor which compares a portion of the output voltage with a reference voltage. Current limiting in such a power supply is often achieved by reducing the drive on the series pass transistor when the voltage across a current sensing resistor in series with the output exceeds the forward conduction voltage of a semi-conductor diode. A typical embodiment of these concepts will be found in U.S. Pat. No. 2,904,742.

While the circuit described above provides regulated output voltage and current limiting, it is far from ideal under short circuit conditions. When such a power supply is shorted, the entire unregulated voltage must be supported by the series pass transistor at the short circuit current, i.e. the full input power must be absorbed by the pass transistor a condition requiring relatively high power transistors for safe operation.

SUMMARY

In accordance with the present invention the output voltage of the power supply is controlled by a series pass transistor which in turn is driven by a transistor which compares a portion of the output with a reference voltage. In one form of the present invention two similar regulators are fed from a single power transformer providing two regulated output voltages. The reference voltage for one of these regulators is provided by a conventional Zener diode. However, the comparison circuit which compares a portion of the output voltage with a reference voltage cannot supply an output voltage which is less than the reference voltage. Furthermore, the characteristics of Zener diodes deteriorates rapidly below about 5 volts making a simple Zener reference inferior at voltages lower than this. Accordingly, in one form of the present invention a method of providing a reference voltage is used which is stable to very low voltages making possible well regulated output voltages at voltages as low as 1 or 2 volts.

The present invention also provides improved gain from the comparison transistor and increase sharpness in the current limiting by means of a single additional transistor. A further improvement is provided by a transistor circuit which controls the current limiting circuit as a function of the output voltage. This latter circuit has particular significance when the output is shorted since under these conditions the output voltage drops to zero and the current limiting circuit reduces the current to a low value. When this happens, the power dissipated in the series pass transistor is reduced to a low value.

DESCRIPTION OF THE PREFERRED EMBODIMENTS

Figures 1, 2:
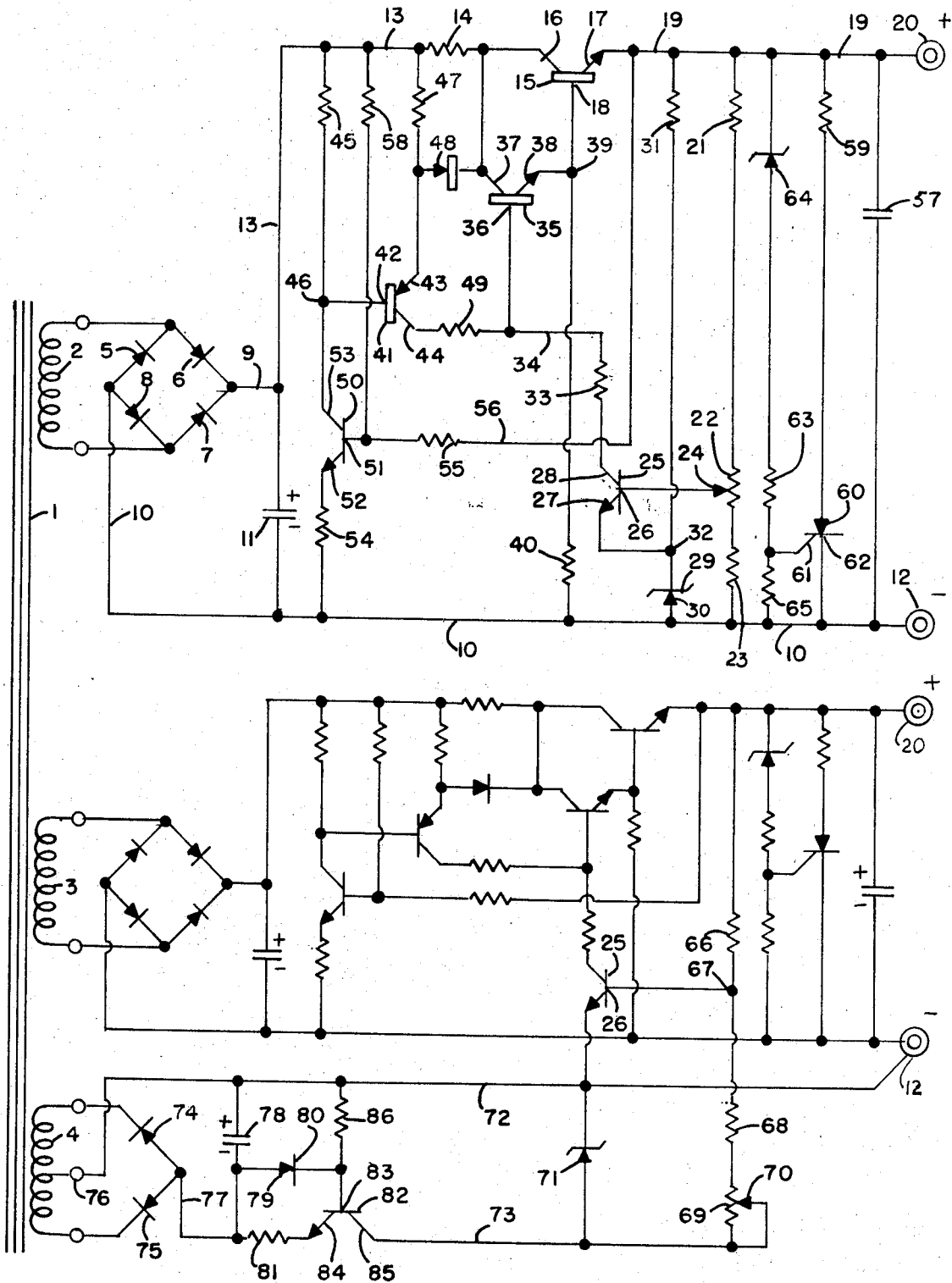
FIG. 1 is a schematic circuit diagram of two forms of the present invention combined in one dual output regulated power supply.
FIG. 2 is a graphical representation of the current limiting characteristics of a power supply in accordance with the present invention.

FIG. 1 is a complete schematic circuit diagram of a dual output regulated power supply in accordance with the present invention. A single power transformer including the common core 1, secondaries 2, 3, 4 and a suitable primary, not shown, provides both the main unregulated power and power for any auxiliary circuits and regulators. Considering the first of the two power supplies, the alternating current voltage across secondary 2 is applied to a bridge rectifier 5–6–7–8 and the resulting rectified voltage is applied across filter capacitor 11 over leads 9 and 10. Lead 10 is the common negative lead which is also connected to negative output terminal 12. The positive output is taken over lead 13, through current sensing resistor 14, from collector 16 to emitter 17 of series pass transistor 15 and over lead 19 to positive output terminal 20. The output voltage across output terminals 12 and 20 is regulated by a circuit in which transistor 25 compares a portion of the output voltage with a reference voltage established across Zener diode 29–30. A portion of the output voltage across leads 10 and 19 is provided at adjustable contact 24 of potentiometer 22 which is connected through resistor 21 to positive lead 19 and through resistor 23 to negative lead 10. It will be evident that by proper choice of these resistors any desired predetermined portion of the output voltage can be provided at contact 24. This portion is applied to base 26 of transistor 25. The reference voltage is established across Zener diode 29–30 by passing a suitable current through it by means of resistor 31 connected to positive lead 19 and by returning anode 30 to negative lead 10. The reference voltage thus established at cathode 29 is applied to emitter 27 of transistor 25 by its connection to junction point 32 between resistor 31 and cathode 29. Collector 28 of transistor 25 is supplied with constant current from a constant current source incorporating transistor 41 through resistors 49 and 33. The complete functioning of transistor 41 will be described in detail below. The potential at collector 28 and so the potential at base 36 of current amplifier transistor 35 will be a direct function of the collector to emitter conductivity of transistor 25. When the voltage at base 26 is above the voltage at emitter 27 by more than the base to emitter drop, the conductivity of the collector 28 to emitter 27 path increases and the collector voltage is reduced also reducing the voltage at base 36. When the voltage at base 36 is reduced, the conductivity of the path between collector 37 and emitter 38 is also reduced and the drive at base 18 of pass transistor 15, connected at 39, is reduced tending to reduce the output voltage across terminals 12 and 20. Another way of saying the latter, is that the impedance between collector 16 and emitter 17 is increased, reducing the voltage fed to positive lead 19.

This reduction in output voltage tends to correct the overvoltage which was assumed to start the chain of control functions, so that the circuit functions as an output voltage regulator. Transistor 25, since collector 28 is fed with a constant current, operates at very high gain and the output voltage regulation is tight even with only one stage of voltage amplification. Base 18 is returned through resistor 40 to negative lead 10 providing cut-off bias to transistor 15 in the absence of forward drive from the regulator circuit.

Transistors 41 and 50 operate cooperatively to provide constant current to regulator transistor 25 as described above and at the same time to limit the output current of the power supply. In order to explain the operation of these transistors, assume for the moment that the circuit through resistor 55 is open. Then, transistor 50 is connected with collector 53 returned to positive lead 13 through resistor 45, base 51 returned to positive lead 13 through resistor 58 and emitter 52 returned to negative lead 10 through resistor 54. It will be seen that the base current will be largely determined by resistor 58 and hence the emitter current will be determined by the base current (times beta) and the value of emitter resistor 54. The voltage drop across resistor 45 will be equal to the collector current (emitter less base current) multiplied by the ohmic value of resistor 45. This will also be the base bias on base 42, the net base 42 to emitter 43 bias being this base bias less the emitter current drop in resistor 47. The constant current as provided at collector 44 will be essentially equal to the voltage across resistor 45, less the base to emitter drop, divided by the ohmic value of resistor 47.

Now, to describe the primary current limiting operation of transistor 41. The output current from lead 13 is passed through a current sensing resistor 14 under which conditions the end of resistor 14 connected to collector 16 will be negative with respect to its other end. Diode 48 is connected between the negative end of resistor 14 and emitter 43 polled in a direction to conduct when the negative end of resistor 14 is negative with respect to emitter 43. Thus, when the output current flowing through resistor 14 makes its negative end more negative than emitter 43, current starts to flow through diode 48 reducing the net forward bias on transistor 41 and hence reducing current from collector 44 and, in turn, reducing the forward drive on base 36 whereby pass transistor 15 becomes less conductive tending to reduce the output current and offsetting the over current condition.

Over the rated current operating range, base 51 is effectively returned to positive output lead 19 through resistor 55. Since this return is more positive than the return point of emitter 52, additional forward bias will be supplied to base 51 causing an added flow of current to collector 53 through resistor 45. This added drop in resistor 45 increases the bias on base 42 and hence the point at which current limiting starts to take place. Turning this around, the maximum current which can be passed to the output will be at full output voltage and if the output voltage is reduced for any reason, as by overload or short-circuit, the current at which limiting takes place will be reduced. This reduction in current which is allowed to pass to the output, thus reduced by reduced output voltage, becomes a minimum when the output voltage is made zero. This maximum current at zero output voltage will be the current flowing as described above with resistor 55 open and will be settable or predeterminable by the choice of ohmic value of resistor 58 while other resistor values remain fixed.

Overvoltage protection is supplied by two parallel circuits connected between the output terminals. One circuit comprises Zener diode 64 in series with resistors 63 and 65. The second circuit comprises silicon controlled rectifier 60–61–62 connected in series with resistor 59. Gate 61 of the silicon controlled rectifier is connected to the junction between resistors 63 and 65. Resistor 63 is provided to limit the current to gate 61 and resistor 65 provides a low impedance between gate 61 and cathode 62. If the output voltage should rise for some reason as, for example, due to loss of control of pass transistor 15, the breakdown voltage of Zener 64 will be exceeded and current will flow to gate 61 and silicon controlled rectifier 60–61–62 will fire shorting the output terminals 12–20 thereby reducing the output voltage to substantially zero.

A regulated power supply of the type described above will generally be provided with an output capacitor 57 connected across the output terminals 12 and 20.

The voltage regulated power supply shown in the lower part of FIG. 1 is generally the same as the one described above except for the method of providing a reference voltage for the regulator transistor 25. The method of providing the reference voltage as shown here has two significant advantages; first, it is adjustable and second, and more important, it will provide a stable reference at lower voltages than can be provided by temperature compensated Zener diodes directly. Since the circuit described above requires that the output voltage be equal to or greater than the reference voltage, in order to obtain output voltages of less than about 5–6 volts some method must be employed for providing a stable low voltage reference.

The main power is supplied from transformer secondary 3 as described above. The reference voltage is provided by an auxiliary voltage source receiving power from secondary 4. From this secondary a constant current source is provided by rectifiers 74 and 75 connected to opposite ends of secondary 4; lead 77 to one side of capacitor 78 and center tap 76 to the other; and transistor 82 with emitter 84 connected through current determining resistor 81 to the negative side of capacitor 78 and base 83 returned to the positive side of capacitor 78 through resistor 86 and base voltage reference Zener 79–80 connected from base 83 to the negative side of capacitor 78. This circuit provides a constant current from collector 85 over lead 73 which is substantially equal to the voltage across Zener 79–80 plus the emitter to base drop of transistor 82 divided by the ohmic value of resistor 81. This constant current over lead 73 is applied to anode of Zener diode 71–72 while the cathode is returned to positive lead 72. Thus, a highly stable reference voltage is established across Zener diode 71.

A four arm bridge is formed (see U.S. Pat. No. 3,028,-538) including Zener diode reference voltage source 71 as one arm; an adjustable resistance comprising fixed resistor 68 in series with potentiometer 69 adjustable by means of variable contact arm 70 as the second arm; fixed resistor 66 as the third arm; and the output across terminals 12 as the fourth arm. This bridge will be balanced so that the junction point 67 between resistors 66 and 68 will be at the same potential as output terminal 12 when the output voltage across terminals 12 and 20 divided by the reference voltage across Zener 71 is equal to the ohmic values of resistor 66 divided by resistor 68 plus 69. Thus, a balance where the output voltage is 2 volts and the reference voltage is 6 volts is attained with resistors 69 plus 68 equal to 3 times resistor 66. If base 26 is connected to junction point 67, transistor 25 will regulate to reduce the output voltage if it is greater than that which is called for by the above computation and vice versa. Thus, the output voltage of the power supply can be programmed to any predetermined value by proper choice of resistors 66, 68 and 69 even to values for less than normal Zener regulating voltages and even approaching zero.

FIG. 2 is a graphical illustration of a typical current limiting characteristic attainable by means of the circuits of the present invention as set forth and described above.

While only two forms of the present invention have been shown and described, many modifications will be apparent to those skilled in the art and within the spirit and scope of the invention as set forth, in particular, in the appended claims.

I claim:

1. A voltage regulated power supply comprising a source of voltage to be regulated, a current sensing resistor, a series pass transistor, and a pair of output terminals all connected in series in the stated order to form a closed loop;
 a comparison amplifier for comparing at least a portion of the voltage across the output terminals with reference voltage means and including means for supplying a control signal to the base of the pass transistor, the improvement which includes;
 a constant current source for said comparison amplifier including a first transistor for providing said current and a second transistor connected to provide a current determining bias to said first transistor;
 wherein said second transistor is bridged across said source of voltage through a collector resistor and an emitter resistor and wherein the voltage drop across said collector resistor provides the current determining bias to said first transistor.

2. A voltage regulated power supply as set forth in claim 1 and including;
 a diode connected between the pass transistor end of said current sensing resistor and the emitter of said first transistor, whereby a voltage drop across said current sensing resistor due to the current to said output terminals, in excess of the conduction voltage of said diode plus the emitter voltage of said first transistor decreases the net forward bias on said first transistor and thereby reduces the current supplied to said comparison amplifier and the control signal supplied to said pass transistor and thus tending to reduce said current to said output terminals.

3. A voltage regulated power supply as set forth in claim 2, and including;
 coupling impedance means connected between the base of said second transistor and the output terminal connected to said pass transistor, whereby the current determining bias supplied by said second transistor to said first transistor is a function of the voltage across said output terminals.

4. A voltage regulated power supply as set forth in claim 1;
 wherein said reference voltage is derived from an adjustable regulated voltage means.

5. A voltage regulated power supply as set forth in claim 1;
 wherein said means for supplying a control signal to the base of said pass transistor includes at least one current amplifier connected between said comparison amplifier and said pass transistor.

6. A voltage regulated power supply as set forth in claim 1;
 and including a resistor for determining the base current to said second transistor.

7. A voltage regulated power supply as set forth in claim 1;
 and including an over-voltage protection circuit including a silicon controlled rectifier connected across said output terminals.

8. A voltage regulated power supply as set forth in claim 7;
 and means for determining the firing voltage of said silicon controlled rectifier including a Zener diode bridged across said output terminals.

References Cited

UNITED STATES PATENTS

| | | | |
|---|---|---|---|
| 3,069,617 | 12/1962 | Mohler | 323—22 |
| 3,304,489 | 2/1967 | Brolin et al. | 323—9 |
| 3,305,764 | 2/1967 | Todd | 323—9 |
| 3,345,554 | 10/1967 | Lupoli | 323—4 |
| 3,426,265 | 2/1969 | Till | 323—9 |

J D MILLER, Primary Examiner

G. GOLDBERG, Assistant Examiner

U.S. Cl. X.R.

307—58; 317—33; 321—14; 323—22